United States Patent
Yang et al.

(10) Patent No.: US 8,525,498 B2
(45) Date of Patent: Sep. 3, 2013

(54) AVERAGE INPUT CURRENT LIMIT METHOD AND APPARATUS THEREOF

(75) Inventors: Eric Yang, Saratoga, CA (US); Jinghai Zhou, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 1372 days.

(21) Appl. No.: 12/183,340

(22) Filed: Jul. 31, 2008

(65) Prior Publication Data
US 2010/0026270 A1    Feb. 4, 2010

(51) Int. Cl.
*G05F 1/00* (2006.01)
(52) U.S. Cl.
USPC .......................................................... 323/282
(58) Field of Classification Search
USPC ......... 323/282, 284, 285, 299, 908; 361/93.9
See application file for complete search history.

(56) References Cited

U.S. PATENT DOCUMENTS

| | | | | |
|---|---|---|---|---|
| 5,590,033 A * | 12/1996 | Kawano | ............................ | 363/25 |
| 6,646,894 B2 * | 11/2003 | Hong et al. | ................. | 363/21.01 |
| 6,831,508 B2 * | 12/2004 | Shima | ............................... | 330/10 |
| 7,176,668 B2 * | 2/2007 | Oswald et al. | ................. | 323/285 |
| 7,196,503 B2 * | 3/2007 | Wood et al. | .................... | 323/276 |
| 7,432,695 B2 * | 10/2008 | Salerno | ......................... | 323/284 |
| 7,498,694 B2 * | 3/2009 | Luo et al. | .......................... | 307/82 |
| 7,701,179 B2 * | 4/2010 | Chen et al. | ...................... | 323/259 |
| 7,750,611 B2 * | 7/2010 | Lee | ................................. | 323/274 |
| 2009/0225990 A1 * | 9/2009 | Miyagi | ............................... | 381/3 |

* cited by examiner

*Primary Examiner* — Jue Zhang
*Assistant Examiner* — Henry Lee, III
(74) *Attorney, Agent, or Firm* — Perkins Coie, LLP

(57) ABSTRACT

The embodiment of invention discloses an average input current limit method and apparatus thereof. The apparatus comprises a switching circuit, a current average circuit and a current limit circuit. The current average circuit samples the input current of the switching circuit and generates a signal representative of the average value of the input current. The current limit circuit limits the signal so as to limit the average value of the input current.

11 Claims, 6 Drawing Sheets

AVERAGE INPUT CURRENT LIMIT METHOD AND APPARATUS THEREOF

TECHNICAL FIELD

The present invention generally relates to an input current limit method, and more particularly, relates to a method and apparatus for limiting the average value of the input current.

BACKGROUND

USB powered devices have become ubiquitous because of the popularity of computers. However, the voltage supplied by a USB connection has a characteristic that limits the use of USB powered devices. Specifically, the output voltage of the USB port will decrease when the output current from the USB port is larger than some value, for example, 500 mA. So there is a need to limit the current supplied by the USB port in order to allow proper use of USB powered devices.

FIG. 1 illustrates one prior art peak current limiting method for current limit. The current (known also as input current in FIG. 1) flowing through the switch Sin is sensed and compared with a threshold VCLM. The switch Sin is turned off when the sensed current is larger than the threshold VCLM, thus limiting the peak value of the input current. However, the duty cycle of the switch Sin varies with different outputs and the actual input current supplied by the power source is the average value of the current flowing through the switch Sin because of the large input capacitor Cin. Therefore, the peak value of the input current does not mean the same current supplied by the power source. When the output voltage is low, a large input current range is wasted.

In order to limit the input current, the peak current limit could also be used to directly limit the peak value of the current supplied by the power source. A disadvantage of this method is that the current supplied by the power source cannot follow the input current flowing rapidly through the switch Sin. Therefore, it cannot be used directly to control the input current, which is a critical parameter on a per cycle basis.

FIG. 2 illustrates another prior art circuit for current limiting. A resistor R and a switch S are coupled between the power source and the power device. The resistor R is used to sense the current supplied by the power source. The "on" resistance of the switch S is regulated according to the sensed current so as to limit the current. In this method, the resistor R cannot be integrated in the same IC with the switch S and other control circuits because it is used to sense and must be very accurate. So the complexity and cost of the whole circuit are increased. The switch S will also increase the power loss and may cause thermal issues.

BRIEF DESCRIPTION OF THE DRAWINGS

The present invention can be further understood with reference to the following detailed description and the appended drawings, wherein like elements are provided with like reference numerals.

DETAILED DESCRIPTION

Disclosed in this description is an input current limit method and apparatus that limits the average value of the input current. DC-input voltage regulators generally have large input capacitors so that the average value of the input current after the input capacitor is absolutely equal to the current actually supplied by the power source. The current supplied by the power source is limited through limiting the average value of the input current.

Figure 1:
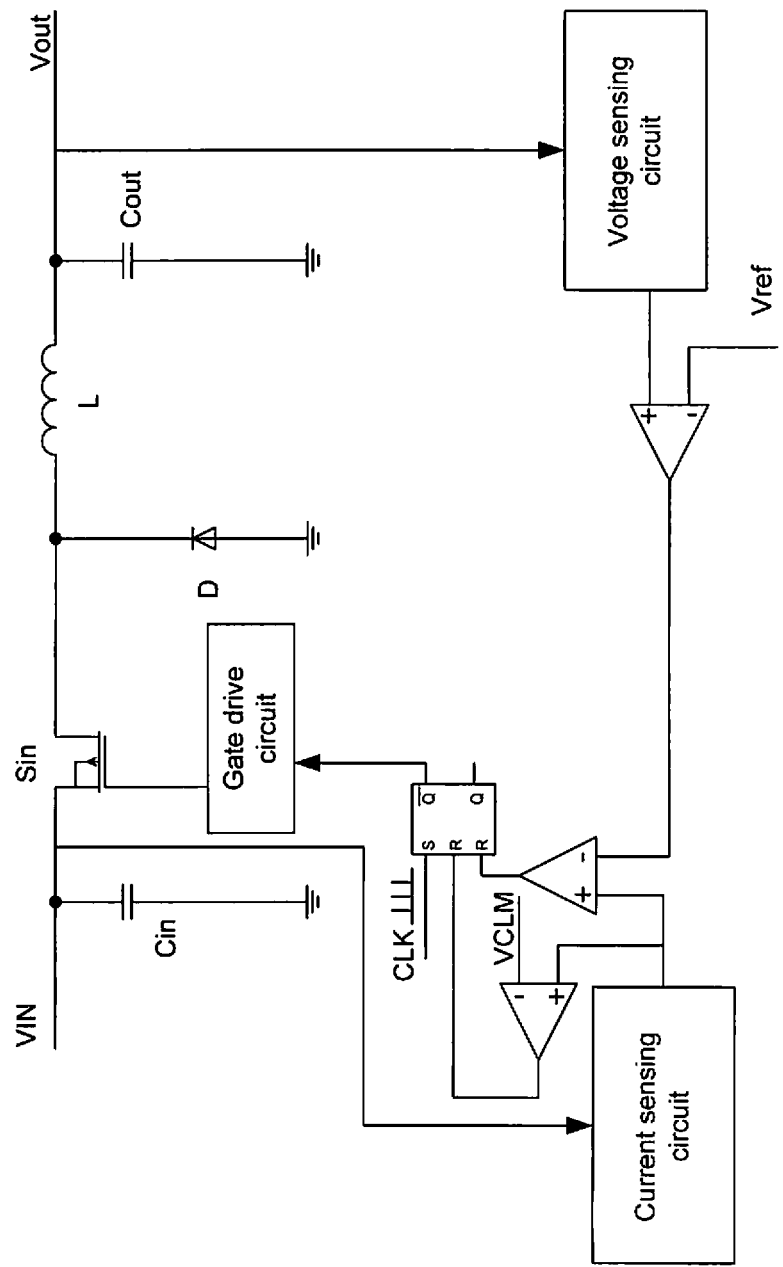
FIG. 1 illustrates a prior art circuit for input current limiting.
Figure 2:
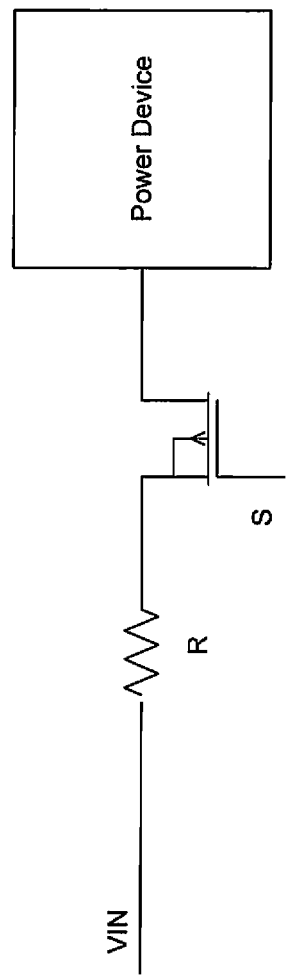
FIG. 2 illustrates another prior art circuit of input current limiting.
Figure 3:
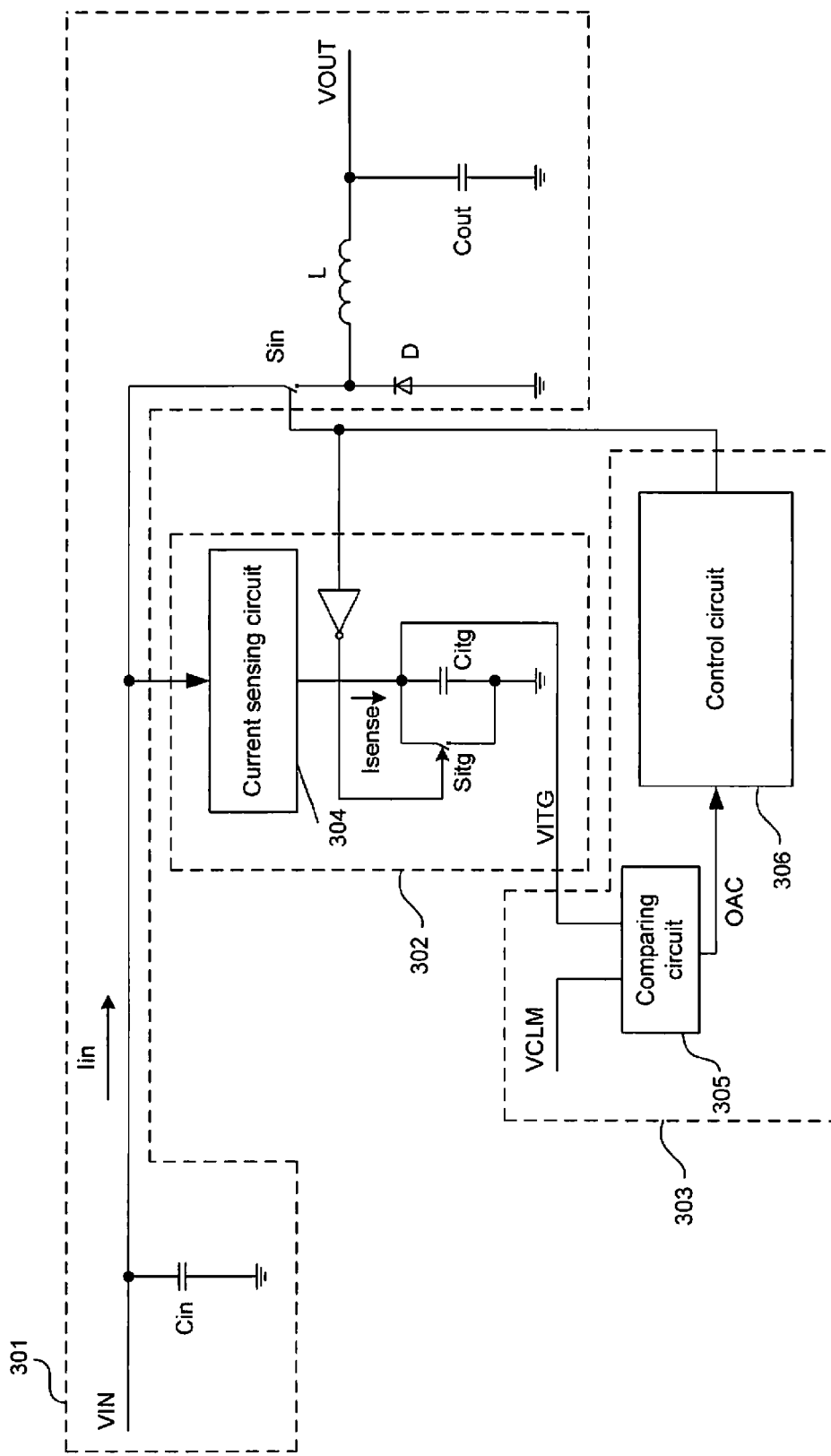
FIG. 3 illustrates a block diagram of a voltage regulator with average input current limit, in accordance with one embodiment of the present disclosure.

FIG. 3 illustrates a block diagram of the voltage regulator with average input current limit in accordance with one embodiment of the present disclosure. It comprises a switching circuit 301, a current average circuit 302 and a current limit circuit 303. The switching circuit 301 comprises an input current Iin and an input capacitance Cin. The current average circuit 302 is coupled to the switching circuit 301 to sense the input current Iin and generate a signal VITG that represents the average value of the input current Iin. The current limit circuit 303 is coupled to the switching circuit 301 and current average circuit 302 to limit the signal VITG to a threshold voltage VCLM, so as to limit the average value of the input current Iin to some value.

The switching circuit 301 comprises a large input capacitor Cin and an input switch Sin through which the input current Iin flows. When the average value of the input current Iin is limited, the actual current supplied by the power source is limited because of the large input capacitor Cin. The switching circuit 301 may be any topology that comprises an input switch, such as Buck, Buck-Boost, flyback and so on. In one embodiment, the switching circuit 301 is a Buck circuit.

The current average circuit 302 comprises a current sensing circuit 304, a capacitor Citg and a switch Sitg. The current sensing circuit 304 is coupled to the switching circuit 301 to sense the input current Iin and generate a sensed current Isense. The current sensing circuit 304 may be a resistor sensing circuit or a circuit that works like a current mirror. One terminal of the capacitor Citg is coupled to the current sensing circuit 304 to receive the sensed current Isense. The other terminal of the capacitor Citg is grounded. The switch Sitg is coupled across the capacitor Citg and is turned on and off complementarily with the input switch Sin. When the input switch Sin is on, the switch Sitg is off, the capacitor Citg is charged by the sensed current Isense, and the voltage VITG across the capacitor Citg is increased. When the input switch Sin is off, the switch Sitg is on, then the capacitor Citg is quickly discharged, and the voltage VITG is quickly decreased to zero. So in each switching cycle, the peak value of the voltage VITG represents the integration value of the input current Iin and also the average value of the input current Iin.

The current limit circuit 303 comprises a comparing circuit 305 and a control circuit 306. The comparing circuit 305 is coupled to the current average circuit 302 to receive the signal VITG, which is representative of the average value of the input current Iin, and compare it with a threshold voltage VCLM to generate a signal OAC. If the signal VITG is larger than the threshold voltage VCLM, the signal OAC is valid, otherwise it is invalid. The control circuit 306 is coupled to the comparing circuit 305 and the switching circuit 301 to receive the signal OAC and control the on and off function of the switches in the switching circuit 301. If the signal OAC is valid, the control circuit 306 will turn off the input switch Sin to limit the voltage VITG, so as to limit the average value of the input current Iin. The comparing circuit 305 may be any circuit that can realize comparison. In one embodiment, it only comprises a comparator. The control circuit 306 may sense one or more parameters of the switching circuit 301, including current, voltage and power, and use any control method such as PFM or PWM to control the on and off function of the switches in the switching circuit 301.

Figure 4:
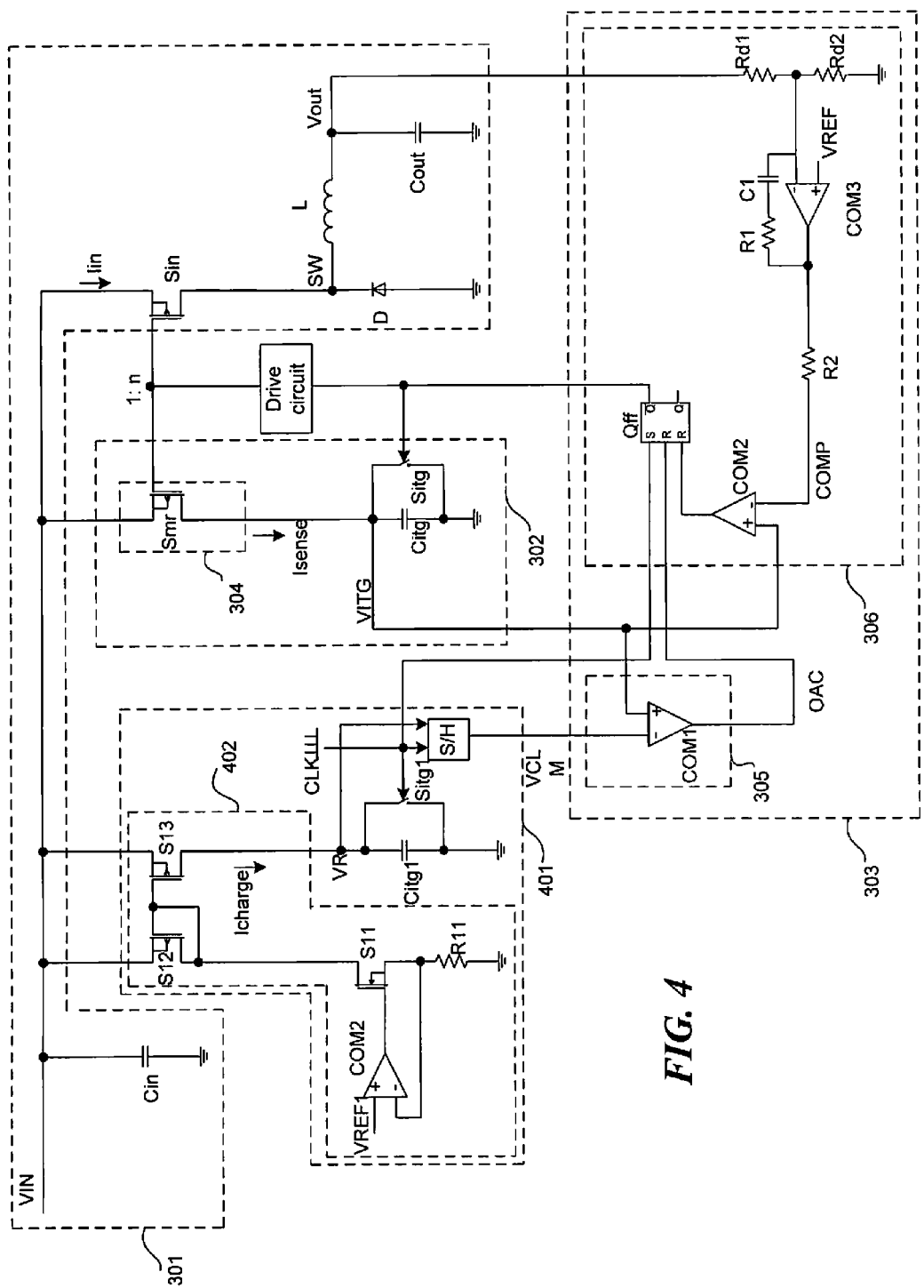
FIG. 4 illustrates a Buck circuit with average input current limit, in accordance with another embodiment of the present disclosure.

FIG. 4 illustrates a Buck circuit with average input current limit in accordance with another embodiment. The switching circuit 301 is a non-synchronous Buck circuit comprising an input capacitor Cin, an input switch Sin, a diode D, an inductor L and an output capacitor Cout. The input switch Sin may be MOSFET or any other kind of semiconductor device, and it may be N-type or P-type. In this embodiment, the input switch Sin is a P-type MOSFET. The diode D may also be substituted by a synchronous rectifier to form a synchronous Buck circuit.

The current average circuit 302 comprises a current sensing circuit 304, a capacitor Citg and a switch Sitg. The current sensing circuit 304 is coupled to the switching circuit 301 to sense the input current Iin and generate a sensed current Isense. One terminal of the capacitor Citg is coupled to the current sensing circuit 304 to receive the sensed current Isense. The other terminal of the capacitor Citg is grounded. The switch Sitg is coupled across the capacitor Citg and turned on and off complementarily with the input switch Sin. The peak value of the voltage VITG across the capacitor Citg represents the average value of the input current Iin.

The comparing circuit 305 comprises a comparator COM1. The non-inverting input terminal of the comparator COM1 is coupled to the current average circuit 302 to receive the voltage VITG. The inverting input terminal of the comparator COM1 is coupled to a threshold voltage VCLM. The output terminal of the comparator COM1 is coupled to the control circuit 306 to output the signal OAC. When the voltage VITG is larger than the threshold voltage VCLM, the signal OAC is valid, i.e., high level, otherwise it is invalid, i.e., low level.

The control circuit 306 is coupled to the comparing circuit 305 and the switching circuit 301, and turns off the input switch Sin when the signal OAC is valid. In this embodiment, the control circuit 306 further senses the output voltage VOUT of the switching circuit 301 and combines it with the signal VITG to control the on and off function of the switches in the switching circuit 301. The control circuit 306 comprises resistors Rd1, Rd2, R1, R2, comparators COM2 and COM3, a capacitor C1 and a flip-flop Qff. The resistors Rd1 and Rd2 form a voltage sensing circuit, i.e., a voltage divider, to sense the output voltage VOUT. This voltage sensing circuit may also be realized by capacitors. The sensed output voltage signal is coupled to the inverting input of the comparator COM3 and the capacitor C1. The other terminal of capacitor C1 is coupled to the resistor R1 of which another terminal is coupled to the output terminal of comparator COM3 and the resistor R2. The other terminal of resistor R2 is coupled to the inverting input of comparator COM2. The non-inverting input of the comparator COM3 is coupled to a voltage reference VREF, which represents the required output voltage. The non-inverting terminal of comparator COM2 is coupled to the voltage VITG. The flip-flop Qff comprises two reset terminals. One is coupled to the comparing circuit 305 to receive the signal OAC, the other is coupled to the output terminal of comparator COM2. The not output Q of the flip-flop Qff is coupled to the drive circuit and the switch Sitg to control the on and off function of the input switch Sin and switch Sitg. The set terminal of the flip-flop Qff is coupled to a clock signal CLK.

The current average circuit 302 may either be external or integrated into the IC together with the current limit circuit 303. If it is integrated, it may be difficult to maintain the capacitance of the capacitor Citg at a constant value. The capacitor Citg may vary with the die temperature. So in situations with the same average input current, the voltage VITG across the capacitor Citg may be different. The result of the comparison between the voltage VITG and the threshold voltage VCLM also may not be accurate. As a result, a threshold correction circuit is needed to adjust the threshold voltage VCLM along with the capacitor Citg.

In one embodiment, a threshold correction circuit 401 is used to adjust the threshold voltage VCLM along with the capacitor Citg. When the integration capacitor Citg becomes larger because of the die temperature, the integration voltage VITG will become lower under the same average input switch current condition. The threshold correction circuit 401 will lower the threshold voltage VCLM along with the voltage VITG to make sure the output of the comparing circuit 305 accurate.

In FIG. 4, the threshold correction circuit 401 comprises a charge current supply circuit 402, a capacitor Citg1, a switch Sitg1, and a sample and hold circuit S/H. The charge current supply circuit 402 is coupled to one terminal of the capacitor Citg1 to provide a constant charge current Icharge for the capacitor Citg1. The other terminal of the capacitor Citg1 is grounded. The switch Sitg1 is parallel with the capacitor Citg1. The sample and hold circuit S/H is coupled to the capacitor Citg1 to sample and hold the voltage VR across the capacitor Citg1. A clock signal is used to control the switch Sitg1 and the sampled and hold circuit S/H. In one embodiment, the threshold correction circuit 401 and the control circuit 306 share the same clock signal CLK. The S/H circuit may sample and hold the voltage VR at the rising edge of the CLK signal or earlier. The sampled and held value is used as the threshold voltage VCLM. The current average circuit 302 and threshold correction circuit 401 are integrated. So the capacitor Citg1 as well as the threshold voltage VCLM will be changed also if the capacitor Citg is changed because of the die temperature.

The charge current supply circuit 402 may be any circuit that can supply constant current. In one embodiment, the charge current supply circuit 402 comprises a comparator COM2, a resistor R11, switch S11, S12 and S13. The non-inverting terminal of the comparator COM2 is coupled to a reference VREF1, and the inverting terminal is coupled to the resistor R11 and the source of the switch S11. The other terminal of the resistor R11 is grounded. The output terminal of the comparator COM2 is coupled to the gate of the switch S11 whose drain is coupled to the gate and drain of the switch S12. The sources of switch S12 and S13 are coupled to the input terminal. The gate of switch S12 and S13 are coupled together. The drain of the switch S13 is coupled to the capacitor Citg1, switch Sitg1 and the sample and hold circuit S/H. Switches S12 and S13 form a current mirror. The charge current Icharge is determined by the reference VREF1, resistor R11 and the width-length rate of switches S12 and S13.

Figure 5:
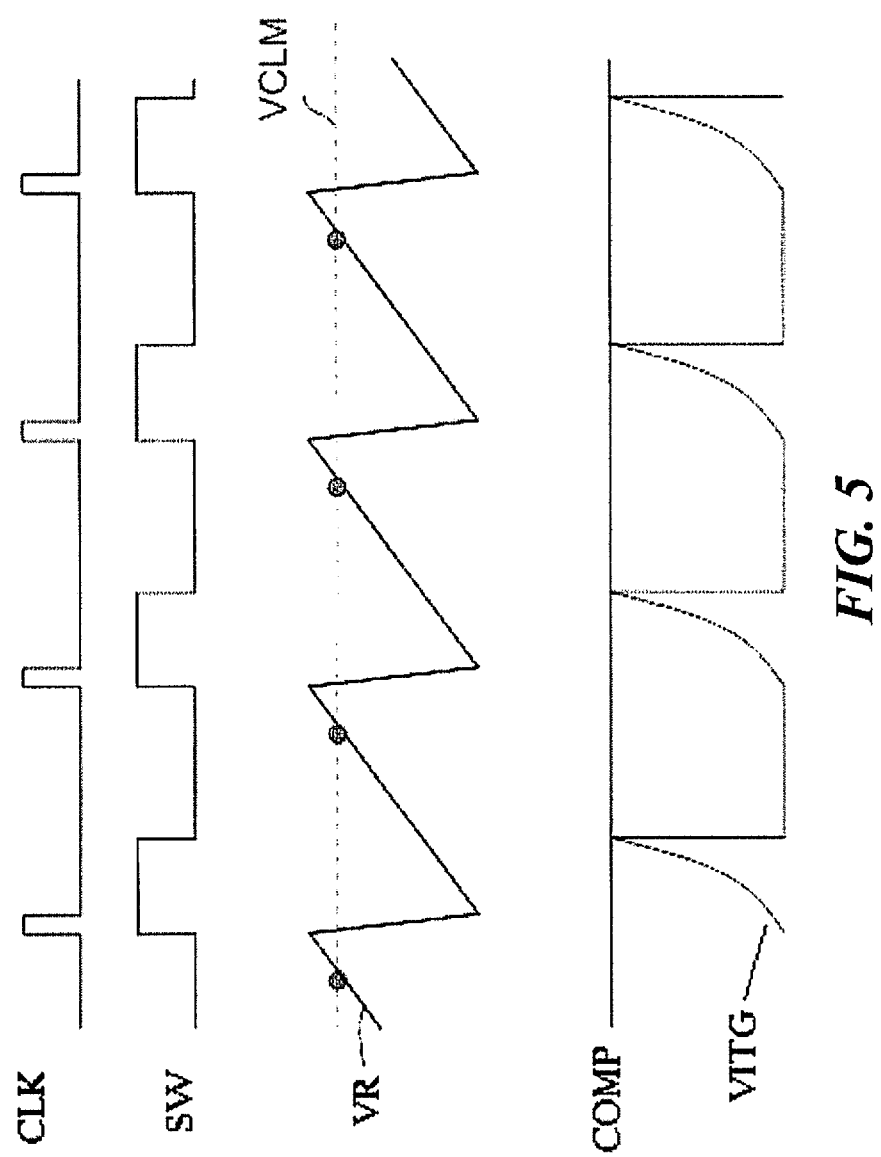
FIG. 5 is the waveform of the circuit shown in FIG. 4 in operation.

FIG. 5 is the waveform of the circuit shown in FIG. 4 in operation. When the CLK signal is high, the flip-flop Qff is set, the not output $\overline{Q}$ of the flip-flop Qff becomes low. The input switch Sin is turned on and the switch Sitg is turned off.

The capacitor Citg is charged by the sensed current Isense, the voltage VITG across the capacitor Citg is increased. The switch Sitg1 is turned on and the capacitor Citg1 is quickly discharged, the voltage VR across the capacitor Citg1 is quickly decreased. In this embodiment, the S/H circuit samples and holds the voltage VR a little bit earlier than the rising edge of the CLK signal. The sampled and held value is used as the threshold voltage VCLM. When the CLK signal is low, the switch Sitg1 is turned off and the capacitor Citg1 is charged by the constant current Icharge supplied by the charge current supply circuit 402. The voltage VR is increased. When the voltage VITG becomes larger than the feedback signal COMP or the threshold voltage VCLM, the flip-flop Qff is reset, the not output $\overline{Q}$ of the flip-flop Qff becomes high. The input switch Sin is turned off and the switch Sitg is turned on. The capacitor Citg is quickly discharged, the voltage VITG across the capacitor Citg is quickly decreased to zero.

When the input switch Sin is on, the switch Sitg is off. The relationship between VITG and ISENSE is $$C_{itg} \frac{dV_{ITG}}{dt} = I_{sense}.$$

When the input switch Sin is off, the switch Sitg is on, $I_{sense}=I_{in}=0, V_{ITG}=0$. Provided the current sampling ratio is n, so $$I_{sense} = \frac{1}{n} I_{in}.$$

The average value of the input current Iin in each cycle is $$\bar{I}_{in} = \frac{\int_0^{T_s} I_{in} dt}{T_s} = \frac{\int_0^{DT_s} n * C_{itg} * dV_{ITG}}{T_s} = \frac{n * C_{itg} * (V_{ITG})_{t=DT_s}}{T_s} = n * C_{itg} * (V_{ITG})_{t=DT_s} * f_s,$$

wherein $f_N$ is the switching frequency of the input switch Sin, i.e., the frequency of the CLK signal, and D is the duty cycle of the input switch Sin. The average value of the input current Iin is limited if the voltage VITG is limited. If we want to limit the average value of the input current Iin to a value limit, then the threshold voltage VCLM should be $$V_{CLM} = \frac{I_{limit}}{n * C_{itg} * f_s}.$$

Through the threshold voltage VCLM and the charge current Icharge and when the sample and hold circuit S/H samples and holds the voltage, the capacitance of the capacitor Citg1 can be decided.

Figure 6:
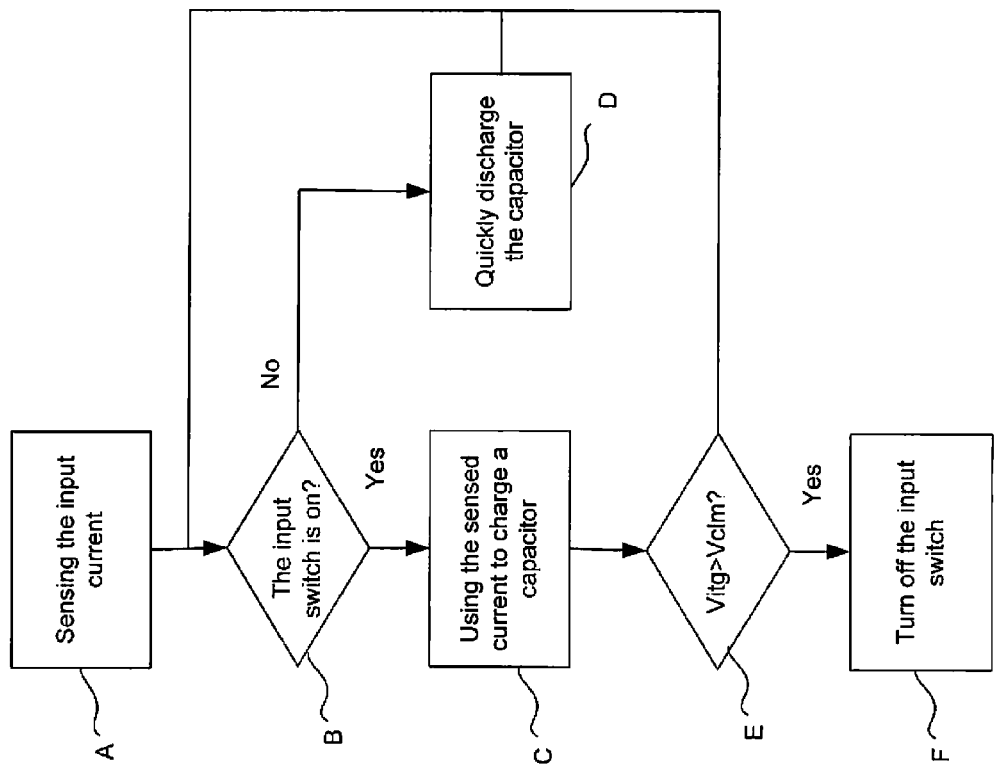
FIG. 6 is the flow chart of the average input current limit method in accordance with still another embodiment of the present disclosure.

The description also discloses an average input current limit method in a voltage regulator, which can limit the average value of the input current. FIG. 6 is the flow chart of the average input current limit method.

Step A, sensing the input current that flows or "is flowing" through the input switch Sin.

Step B, determining whether the input switch Sin is on. If the input switch Sin is on, go to step C, otherwise go to step D.

Step C, using the sensed current to charge a capacitor Citg, then go to step E.

Step D, quickly discharging the capacitor Citg, then go to step B.

Step E, determining whether the voltage Vitg across the capacitor Citg is larger than a threshold voltage Vclm. If yes, go to step F, else go to step B.

Step F, turn off the input switch Sin.

In one embodiment, the method further comprises a step to adjust the threshold voltage Vclm with the capacitor Citg.

In one embodiment, the method further comprises using the voltage Vitg across the capacitor Citg in controlling the on and off function of the switches in the voltage regulator.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A voltage regulator circuit, comprising:
   a switching circuit having an input current;
   a current average circuit electrically coupled to said switching circuit to generate a signal indicative of the average value of said input current; and
   a current limit circuit electrically coupled to said switching circuit and said current average circuit to limit said average value of said input current to a value,
   wherein said switching circuit further comprises an input switch through which said input current flows;
   wherein said current average circuit comprises:
      a current sensing circuit electrically coupled to said input switch to sense said input current and generate a sensed current proportional to said input current;
      a first capacitor electrically coupled to said current sensing circuit and said current limit circuit; and
      a first switch electrically coupled across said first capacitor;
      wherein when said first switch is on, said first capacitor is charged by said sensed current and when said first switch is off, said first capacitor is discharged;
   wherein said first switch is turned on and off complementarily to said input switch;
   wherein said current limit circuit compares the voltage across said first capacitor with a threshold voltage and turns off said input switch when said voltage across said first capacitor and said threshold voltage fulfill a relationship;
   wherein said relationship is that said voltage across said first capacitor is larger than said threshold voltage;
   the circuit further comprising a threshold correction circuit operable to adjust said threshold value along with said first capacitor; and
   wherein said threshold correction circuit is integrated in the same IC with said current average circuit and comprising:
      a second capacitor;
      a second switch electrically coupled across said second capacitor;
      a current supply circuit electrically coupled to said second capacitor to supply charge current to said second capacitor; and
      a sample and hold circuit electrically coupled to said second switch and said current limit circuit to sample and hold the voltage across said second capacitor;
   wherein said second switch and said sample and hold circuit are controlled by a clock signal; and the output of said sample and hold circuit is used as said threshold voltage.

2. The voltage regulator circuit of claim 1, wherein said current supply circuit comprises:

a first comparator, the non-inverting input terminal of said first comparator is electrically coupled to a first voltage reference;

a third switch, the gate of said third switch is electrically coupled to the output terminal of said first comparator;

a first resistor, one terminal of said first resistor is electrically coupled to the inverting input terminal of said first comparator and the source of said third switch, the other terminal of said first resistor is grounded;

a current mirror circuit comprising a fourth switch and fifth switch, the drain of said fourth switch is electrically coupled to the drain of said third switch and the gate of said fourth and fifth switch, the source of said fourth and fifth switch are electrically coupled to the input terminal of said switching circuit, the drain of said fifth switch is electrically coupled to said second capacitor.

3. A voltage regulator circuit, comprising:

a switching circuit having an input current;

a current average circuit electrically coupled to said switching circuit to generate a signal indicative of the average value of said input current; and a current limit circuit electrically coupled to said switching circuit and said current average circuit to limit said average value of said input current to a value, wherein said switching circuit further comprises an input switch through which said input current flows;

wherein said current average circuit comprises:

a current sensing circuit electrically coupled to said input switch to sense said input current and generate a sensed current proportional to said input current;

a first capacitor electrically coupled to said current sensing circuit and said current limit circuit; and a first switch electrically coupled across said first capacitor;

wherein when said first switch is on, said first capacitor is charged by said sensed current and when said first switch is off, said first capacitor is discharged;

wherein said first switch is turned on and off complementarily to said input switch;

wherein said current limit circuit compares the voltage across said first capacitor with a threshold voltage and turns off said input switch when said voltage across said first capacitor and said threshold voltage fulfill a relationship;

wherein said relationship is that said voltage across said first capacitor is larger than said threshold voltage;

wherein said current limit circuit comprises:

a comparing circuit, comparing the voltage across said first capacitor with said threshold voltage and generating a comparing signal, if the voltage across said first capacitor is larger than said threshold voltage, said comparing signal is valid, otherwise, it is invalid; and a control circuit, electrically coupled to said comparing circuit and said switching circuit, to receive said comparing signal and control the on and off function of the switches in said switching circuit;

wherein when said comparing signal is valid, said control circuit turns off said input switch;

wherein said comparing circuit comprises a second comparator, the non-inverting terminal of said second comparator is electrically coupled to said first capacitor to receive the voltage across it, the inverting terminal of said second comparator is electrically coupled to said threshold voltage, and the output terminal of said second comparator is coupled to said control circuit to output said comparing signal; and wherein said control circuit comprises:

a feedback circuit, electrically coupled to said switch circuit, operable to sense a parameter of said switch circuit and generate a feedback signal;

a third comparator, the non-inverting terminal of said third comparator is electrically coupled to said first capacitor to receive the voltage across it, the inverting terminal of said third comparator is electrically coupled to said feedback signal; and a flip-flop with two reset terminals and one set terminal, the set terminal of said flip-flop is coupled to a clock signal, one reset terminal of said flip-flop is electrically coupled to the output terminal of said second comparator, the other reset terminal of said flip-flop is electrically coupled to the output terminal of said third comparator, the output terminal of said flip-flop is used to control switches in said switching circuit.

4. The voltage regulator circuit of claim 3, wherein said parameter of said switch circuit is an output voltage, and said feedback circuit comprises:

an output voltage sensing circuit, electrically coupled to said switching circuit to sense the output voltage of said switching circuit and generate a sensed voltage proportional to said output voltage;

a fourth comparator, the non-inverting input terminal of said fourth comparator is electrically coupled to a second voltage reference, the inverting input terminal of said third comparator is electrically coupled to said output voltage sensing circuit to receive said sensed voltage.

5. The voltage regulator circuit of claim 2, wherein said current limit circuit comprises:

a comparing circuit, comparing the voltage across said first capacitor with said threshold voltage and generating a comparing signal, if the voltage across said first capacitor is larger than said threshold voltage, said comparing signal is valid, otherwise, it is invalid; and a control circuit, electrically coupled to said comparing circuit and said switching circuit, to receive said comparing signal and control the on and off function of the switches in said switching circuit;

wherein when said comparing signal is valid, said control circuit turns off said input switch.

6. The voltage regulator circuit of claim 5, wherein said comparing circuit comprises a second comparator, the non-inverting terminal of said second comparator is electrically coupled to said first capacitor to receive the voltage across it, the inverting terminal of said second comparator is electrically coupled to said threshold voltage, and the output terminal of said second comparator is coupled to said control circuit to output said comparing signal.

7. The voltage regulator circuit of claim 6, wherein said control circuit comprises:

a feedback circuit, electrically coupled to said switch circuit to sense a parameter of said switch circuit and generate a feedback signal;

a third comparator, the non-inverting terminal of said third comparator is electrically coupled to said first capacitor to receive the voltage across it, the inverting terminal of said third comparator is electrically coupled to said feedback signal;

a flip-flop with two reset terminals and one set terminal, the set terminal of said flip-flop is coupled to a clock signal, one reset terminal of said flip-flop is electrically coupled to the output terminal of said second comparator, the other reset terminal of said flip-flop is electrically coupled to the output terminal of said third comparator, the output terminal of said flip-flop is used to control switches in said switching circuit.

8. The voltage regulator circuit of claim 7, wherein said parameter of said switch circuit is output voltage, and said feedback circuit comprises: an output voltage sensing circuit, electrically coupled to said switching circuit to sense the output voltage of said switching circuit and generate a sensed voltage proportional to said output voltage; a fourth comparator, the non-inverting input terminal of said forth comparator is electrically coupled to a second voltage reference, the inverting input terminal of said third comparator is electrically coupled to said output voltage sensing circuit to receive said sensed voltage.

9. The voltage regulator circuit of claim 8, wherein said output voltage sensing circuit is a resistor voltage divider circuit.

10. The voltage regulator circuit of claim 9, wherein said switching circuit is a Buck circuit.

11. The voltage regulator circuit of claim 10, wherein said Buck circuit is synchronous.

* * * * *